United States Patent
Ball, IV

(10) Patent No.: US 11,458,418 B2
(45) Date of Patent: Oct. 4, 2022

(54) SEPARATION TANK FOR SAND, OIL AND WATER

(71) Applicant: KBK Industries, LLC, Rush Center, KS (US)

(72) Inventor: Will Dexter Ball, IV, Bixby, OK (US)

(73) Assignee: KBK Industries, LLC, Rush Center, KS (US)

( * ) Notice: Subject to any disclaimer, the term of this patent is extended or adjusted under 35 U.S.C. 154(b) by 279 days.

(21) Appl. No.: 16/738,443

(22) Filed: Jan. 9, 2020

(65) Prior Publication Data
US 2021/0213374 A1    Jul. 15, 2021

(51) Int. Cl.
| | |
|---|---|
| B01D 17/035 | (2006.01) |
| B01D 17/02 | (2006.01) |
| C02F 1/40 | (2006.01) |
| C02F 1/24 | (2006.01) |
| B01D 21/26 | (2006.01) |
| B01D 19/00 | (2006.01) |
| C02F 1/20 | (2006.01) |
| C02F 103/10 | (2006.01) |
| C02F 101/32 | (2006.01) |

(52) U.S. Cl.
CPC ...... B01D 17/0205 (2013.01); B01D 17/0211 (2013.01); B01D 17/0214 (2013.01); B01D 17/0217 (2013.01); B01D 19/0057 (2013.01); B01D 21/265 (2013.01); C02F 1/20 (2013.01); C02F 1/24 (2013.01); C02F 1/40 (2013.01); C02F 2101/32 (2013.01); C02F 2103/10 (2013.01)

(58) Field of Classification Search
CPC ............ B01D 17/0205; B01D 17/0211; B01D 17/0214; B01D 17/0217; B01D 19/0057; B01D 21/265; C02F 1/24; C02F 1/40
USPC ...................... 210/703, 801, 221.2, 519, 540
See application file for complete search history.

(56) References Cited

U.S. PATENT DOCUMENTS

| | | | |
|---|---|---|---|
| 3,418,236 A | * | 12/1968 | Mail .......................... C02F 1/24 210/221.2 |
| 4,120,795 A | | 10/1978 | Laval, Jr. |
| 5,073,266 A | | 12/1991 | Ball, IV |
| 5,080,802 A | * | 1/1992 | Cairo, Jr. ........... B01D 17/0205 210/221.2 |
| 5,711,374 A | | 1/1998 | Kjos |
| 6,228,148 B1 | | 5/2001 | Aaltonen et al. |

(Continued)

*Primary Examiner* — Christopher Upton
(74) *Attorney, Agent, or Firm* — Leydig, Voit & Mayer, Ltd.

(57) ABSTRACT

A separation tank for the separation of a mixture of oil, gas, water, and solids obtained from an oil field includes distinct regions vertically located within the tank interior where constituent components of the mixture can collect. The inflowing mixture may be directed to a vertical column extending inside the separation tank and can be introduced to the tank interior through a swirl vane diffuser configured to impart a helical direction to the inflowing mixture that assist separation of the mixture component. To further facilitate separation of oil from the mixture, the separation tank may be operatively associated with an aeration system configured to generate and introduce an aerated liquid to the tank interior. Gas dissolved in the aerated liquid may form microbubbles that can naturally adhere to the oil and solids separate it from the mixture which can improve the quality of the water.

16 Claims, 4 Drawing Sheets

(56) References Cited

U.S. PATENT DOCUMENTS

| | | |
|---|---|---|
| 6,250,473 B1 | 6/2001 | Golightley et al. |
| 7,374,668 B1 | 5/2008 | DiValentin et al. |
| 8,226,820 B1 | 7/2012 | Wegner |
| 8,257,588 B2 | 9/2012 | Mori et al. |
| 8,496,740 B1 * | 7/2013 | Ball, IV ............. B01D 17/0208 |
| | | 210/537 |
| 9,744,478 B1 * | 8/2017 | Ball, IV ............. B01D 17/0211 |
| 9,765,265 B2 | 9/2017 | Ball, IV |
| 10,981,088 B2 * | 4/2021 | Ball, IV ............... B01D 21/265 |
| 2004/0035799 A1 * | 2/2004 | Smith ................ B01D 17/0217 |
| | | 210/221.2 |
| 2006/0213840 A1 * | 9/2006 | Stacy ................ B01D 17/0205 |
| | | 210/221.2 |
| 2006/0283788 A1 * | 12/2006 | Schreppel, Jr. ........ B01D 21/26 |
| | | 210/221.2 |
| 2010/0269696 A1 | 10/2010 | Sarshar et al. |
| 2013/0083620 A1 | 4/2013 | Hypes et al. |
| 2014/0275690 A1 | 9/2014 | Hernandez et al. |
| 2015/0076083 A1 * | 3/2015 | Folkvang ........... B01D 17/0205 |
| | | 210/767 |
| 2019/0224593 A1 * | 7/2019 | Ball, IV ............. B01D 17/0214 |

* cited by examiner

SEPARATION TANK FOR SAND, OIL AND WATER

FIELD OF THE DISCLOSURE

The disclosure relates to separation tanks and, more particularly, to a tank for separating sand and sediment from a mixture of water and oil from an oil or gas production field.

BACKGROUND OF THE INVENTION

Fluid streams from oil production fields often contain a variety of components, including sand and silt from fracturing operations, drilling fines, formation fines, water, oil, micro-organisms, in aggregate "suspended solids," and gases. It is desirable to separate the suspended solids and gases from the liquid stream, and to separate the separable oil from the water in the liquid stream. The separation and removal of sand and other suspended solids and associated gases promotes more efficient oil-water separation in downstream processes, adding to oil volumes and minimizing water pollution. The separation of solids from the oil and water mixture is typically done in so-called separation tanks, which allow sand and other solids to settle and accumulate while liquid components such as oil and water flow out of the tank. Typical separation tanks use gravity to settle solids from the oil and water liquids that are recovered from the ground. Thereafter, oil and water are allowed to separate from each other due the immiscibility of the two substances. The oil may float on the water and may be skimmed off and removed from the separation tank.

The efficiency and speed of separation is important in that it dictates the quality and speed of separation of oil and water generally in an oil production operation.

BRIEF SUMMARY OF THE INVENTION

In an aspect, the disclosure describes a separation tank for the separation of oil and water received from an oil or gas production field. The separation tank may include a vertical column in the tank interior in which an inflowing mixture is directed. The inflowing mixture may be introduced to the tank interior through a spiral vane diffuser mounted to the vertical column and configured to impart a directional flow to the incoming mixture. Gas, oil, water, sand and/or sediment may separate from the inflowing mixture an accumulate in vertical separation regions within the tank interior. To facilitate separation of oil from the incoming mixture, the separation tank can be operatively associated with an aeration system that produces and delivers an aerated liquid to the vertical column to mix with the incoming mixture. Air or gas bubbles in the aerated liquid can adhere to oil in the incoming liquid and cause the oil to float to an oil region in the tank interior for collection.

In another aspect, the disclosure describes a separation tank that includes a vertical column in a tank interior to receive an inflowing mixture and to introduce the incoming flow to the tank interior. A flow diverting baffle may be mounted to the vertical column proximately below where the inflowing mixture is introduced to the tank interior. To facilitate separation of oil from the inflowing mixture, the separation tank can be operatively associated with an aeration system that produces and delivers an aerated liquid to mix with the inflowing mixture. The aeration system includes a discharge conduit that delivers the aerated liquid proximately about the flow diverting baffle to mix with the inflowing mixture introduced to the tank interior at a location above the flowing diverting baffle.

DETAILED DESCRIPTION OF THE INVENTION

Figure 1:
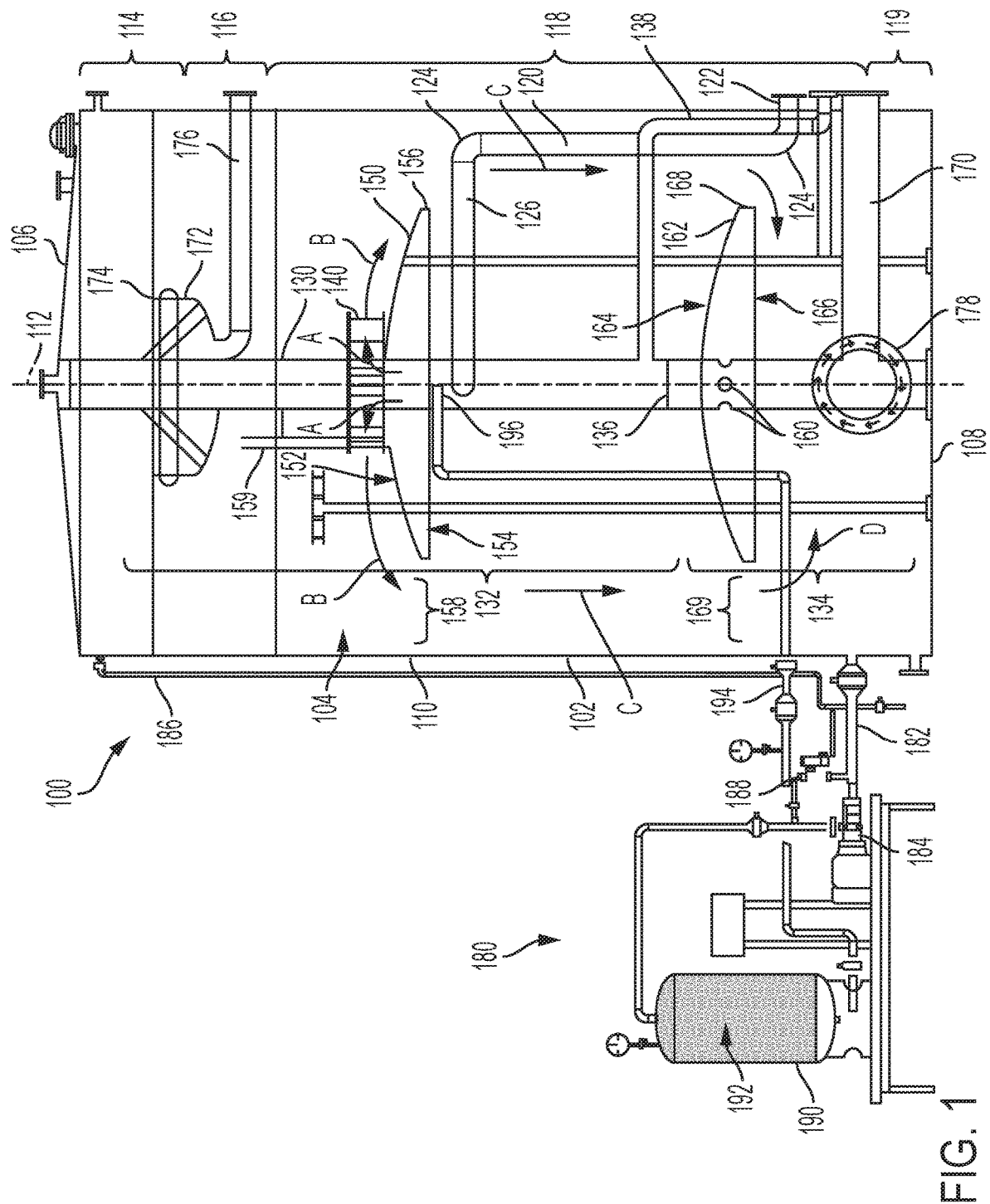
FIG. 1 is a side elevational view of the interior of a separation tank for separating oil, water, and sand showing the components therein and an aeration system operatively associated with the separation tank according to an aspect of the disclosure

Referring now to the figures, wherein like reference numbers will refer to like elements wherever possible, there is illustrated in FIG. 1 a separation tank 100 for the separation of an inflowing mixture of water, oil, gas, and sediment from an oil or natural gas production field. The separation tank 100 includes a tank shell 102 that defines a tank interior 104. The tank shell 102 has a top portion or top tank lid 106, a bottom tank floor 108, and a tank sidewall 110 that enclose the tank interior 104. The tank sidewall 110 may be cylindrical and may be disposed around and define a central axis 112 that extends between the tank lid 106 and the tank floor 108; however, in other embodiments, the tank sidewall may have other shapes such as octagonal. In the illustrated embodiment, the separation tank 100 can be oriented vertically so that the central axis 112 is arranged in the vertical direction. In operation, the separation tank 100 functions to separate by gravity the flow of an incoming mixture into constituents, which may be accommodated in various vertical regions of the tank interior 104 according to their relative weights and densities. For example, in an embodiment, the tank interior 104 may be arranged in an axially upward gas region 114 proximate the tank lid 106, an oil region 116 disposed axially below the gas region 114, a liquid region 118 disposed axially below the oil region 116, and an axially bottommost sediment region 119 proximate the tank floor 108 of the tank shell 102. In other embodiments, including those intended for use with incoming mixtures of different constituents, different or additional separation regions are contemplated.

To receive the flow of incoming mixture, the separation tank 100 can include an inlet conduit 120 that is disposed through the tank sidewall 110 into the tank interior 104. The inflowing mixture may be a fluid or aqueous solution from an oil production field that is directed to the separation tank 100 under pressure, although aspects of the disclosure may be applicable to other technologies and production processes. The inlet conduit 120 can be made of hollow piping to channel and direct fluid flow. The inlet conduit 120 can include an inlet port 122 disposed exteriorly of the tank sidewall 110 that can be configured with flanges or the like to couple with piping and hoses from the production field. In an embodiment, the inlet port 122 may be located at the same vertical location as the lower portion of the liquid region 118 just above the sediment region 119. The inlet conduit 120 can include various elbows 124 and lengths 126 that direct it axially upwards and radially inwards with respect to the center axis 112.

The inlet conduit 120 can be in fluid communication with a vertical column 130 that is vertically disposed in the tank interior 104 and that may extend between the tank floor 108 and the tank lid 106. The vertical column 130 may be a large diameter hollow pipe for accommodating and directing fluid. In an embodiment, the vertical column 130 may be centrally located in the tank interior 104 and may coaxially align with the central axis 112 of the tank 100, but in other embodiments, the vertical column may be located elsewhere in the tank interior. The vertical column 130 can be separated into two vertical sections including a vertically upwards upper section 132 and a vertically downward lower section 134. The upper section 132 and the lower section 134 can be separated by a blanking plate 136, also referred to as a sealed baffle, that is disposed inside the center column 130. The blanking plate 136 may be a horizontal plate or corresponding structure that blocks or prevents fluid within the vertical column 130 from flowing between the upper section 132 and the lower section 134. The blanking plate 136, and therefore the separation between the upper section 132 and the lower section 134, may be axially located at any suitable vertical elevation with respect to the central axis 112, although in the illustrated embodiment the blanking plate may be disposed toward the lower third of the vertical column. The inlet conduit 120 is coupled to and communicates with the interior of the upper section 132 so that the inflowing mixture is directed to and can be accommodated therein. The inlet conduit 120 may connect with the upper section 132 at any suitable vertical location, but may preferably connect along the upper third of the vertical column 130. In an embodiment, the inlet conduit 120 can be joined to the vertical column 130 at a right angle, and as incoming mixture fills the upper section 132, sand and solids may settle out and collect on the blanking plate 136. To remove the sediment collecting on the blanking plate 136, a removal conduit 138 can be communicatively connected to the upper section proximately above the blanking plate 136 and which can extend through the tank sidewall 110 to the exterior of the separation tank 100. Sediment can therefore be periodically removed from the vertical column 130.

To introduce the inflowing mixture to the tank interior 104, the upper section 132 of the vertically column 130 can be operatively associated with a swirl vane diffuser 140. The swirl vane diffuser 140 may be mounted to the vertical column 130 and may be located in the upper portions of the liquid region 118 and below the oil region 116. The swirl vane diffuser 140 can be in fluid communication with and provide access to the interior of the upper section 132 so that the incoming mixture accommodated therein can be directed radially toward the tank sidewall 110. Hence, the flow of inflowing mixture is redirected from axially upward in the vertical column 130 to radially outward in the swirl vane diffuser 140 as indicated by arrow A. Moreover, the inflowing mixture may be discharged circularly in a 360° pattern outward from the center of the swirl vane diffuser so that the mixture is directed toward the tank sidewall 110.

Figure 2:
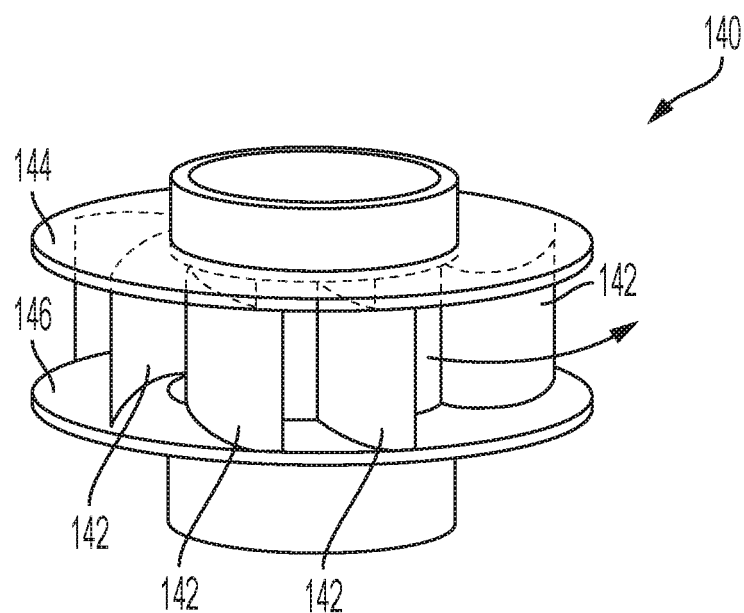
FIG. 2 is a perspective view of a swirl vane diffuser configured to impart a spiral or helical direction to the flow of the inflowing mixture entering the tank interior.

To impart a spiraling or helical direction to the flow, referring to FIG. 2, the swirl vane diffuser 140 can include a plurality of curved, spaced apart vanes 142 that are located and fixed between an upper diffuser plate 144 and a lower diffuser plate 146 that may be horizontally disposed and parallel to each other. The upper and lower diffuser plates 144, 146 may be circular in shape and the vanes 142 may radially curve from the center towards the circumference. Hence, when the inflowing mixture radially flows through the swirl vane diffuser 140, the vanes 142 impart a helical direction to the mixture and direct it tangentially toward the tank sidewall 110 where it can flow circularly or spirally within the tank interior 104. Because of the expansive volume provided by the liquid region 118 of the tank interior 104, the inflowing mixture may slow allowing oil to coalesce and solids to settle out from the mixture. In an embodiment, it may be appreciated that because the spaces between the vanes 142 proximate the center of the swirl van diffuser 140 are narrower as compared to the spaces proximate the circumference of the diffuser, the vanes function as a diffusing nozzle slowing the flow of incoming mixture.

Referring back to FIG. 1, to direct the inflowing mixture from the swirl vane diffuser 140 radially toward the tank sidewall 110 and to function as a coalescing surface, an upper flow diverting baffle 150 can be mounted to the vertical column 130 immediately below the diffuser. The upper flow diverting baffle 150 can be have a circular outline with a generally rounded structure including a larger diameter than the swirl vane diffuser 140 and can include a convex upper surface 152 and a concave lower surface 154. The outer circumference of the upper flow diverting baffle 150 can be located radially outward from the vertical column 130 toward the tank sidewall 110 and can terminate at an upper baffle rim 156 that has a smaller diameter than and is spaced apart from the tank sidewall. When the inflowing mixture exits from the swirl vane diffuser 140, the flow can be directed along the convex upper surface 152 radially toward the tank sidewall 104 as indicated by arrow B, which allows oil droplets to collect and gather on the convex upper surface 152. In addition, because of the curved vanes 142 of the swirl vane diffuser 140, the inflowing mixture will be directed to circularly flow in the tank interior 104 around the central axis 112.

To enable the flow of inflowing mixture to proceed axially downward to the lower portion of the liquid region 118, the gap between the upper baffle rim 156 and the tank sidewall 110 can define an upper annular passage 158. As the flow of inflowing mixture reaches the upper baffle rim 156, it can be directed axially downward through the upper annular passage 158 and underneath the upper flow diverting baffle 150 as indicated by arrow C. As the flow of inflowing mixture is directed between the narrow upper annular passage 158, the compressive actions may cause oil entrained in the mixture may coalesce on the interior of the tank sidewall 110. Once the flow passes the upper annular passage 158, the additional volume of the liquid region 118 provided under the upper flow diverting baffle 150 can accommodate and slow the inflowing mixture and prolong the time for oil to further coalesce and solids to settle. Coalescing oil can collect on the concave lower surface 154 of the upper flow diverting baffle 150 and, to direct the collected oil to the oil region 116, a baffle pipe 159 may be attached to the upper flow diverting baffle and may extend vertically upwards through the upper portion of the liquid region 118. Accordingly, such coalesced oil would not flow back through the upper annular passage 158 where it could become mixed again with the inflowing mixture.

To remove recovered liquid, which may be aqueous clarified water, from tank interior 104 of the separation tank 100, the lower section 134 of the vertical column 130 can have a plurality of orifices 160 disposed therein at an axially lower region thereof so that liquid can be received again into the vertical column. The orifices 160 can be circular apertures disposed into the tubular vertical column 130 vertically below the blanking plate 136 so that the recovered water received into the lower section 134 is blocked from flowing to the upper section 132. To assist in directing recovered water to the orifices 160, a lower flow diverting baffle 162 can be mounted to the vertical column 130 generally proximate with the vertical elevation of the orifices. Like the upper flow diverting baffle 150, the lower flow diverting baffle 162 can be convex on its upper surface 164 can concave on its lower surface 166. The lower flow diverting baffle 162 provides another surface on which oil may collect and coalesce, thus removing remaining oil from the inflowing mixture. In addition, the lower flow diverting baffle extends radially outwards to a lower baffle rim 168. The lower baffle rim 168 is also spaced apart from the interior of the tank sidewall 110 to provide another lower annular passage 169 which the inflowing mixture that is being directed axially downward in the separation tank 100 can pass through as it is directed toward the orifices 160. The narrow lower annular passage 169 provides another location where solids entrained in the inflowing mixture can settle out and descend to the tank floor 108 and collect in the sediment region 119. In addition, as the inflowing mixture flows around lower baffle rim 168, the lower flow diverting baffle 162 can redirect the inflowing mixture from the axially downward direction radially inward toward the center axis 112 and the orifices 160 disposed in the lower section 134, as indicated by arrow D. The lower section 134 can be in fluid communication with one or more outlet conduits 170 that extend radially outward from the center column 130 and that pass through the tank sidewall 110 to the exterior of the separation tank 100. The recovered water may be reused for operations in the oil or gas production field.

In an embodiment, to regulate the vertical locations of the oil region 116 and the liquid region 118, the separation tank 100 may be operatively associated with one or more water legs. A water leg may include a vertically arranged outside pipe coaxially surrounding and extending parallel with a smaller diameter inside pipe. The outside pipe may be coextensive with the vertical height of the separation tank 100 and the inside pipe may be shorter in height and terminate in a weir disposed below the vertical extension of the outside pipe. The outside pipe may have a larger diameter than the inside pipe so that an annular gap is formed there between. In operation, recovered water from the outlet conduit 170 is directed to the annual gap between the outside and inside pipes and may accumulate therein until the recovered water rises over the weir and enters the inside pipe. Because the tank interior 104 and the water legs are in direct fluid communication, the vertical height in the respective volumes and the resulting fluid pressure will tend to hydrostatically balance, thereby controlling the vertical locations of the oil region 116 and liquid region 118 in the separation tank 100.

Because oil is lighter than water, oil which has separated from the flow of inflowing mixture in the tank interior 104 can rise vertically upwards to the oil region 116 where it can accumulate and float above the water region 118. To collect and remove the recovered oil from the oil region 116, the separation tank 100 can include an oil spillover bucket 172. The oil spillover bucket 172 is an open bucket-like structure that can be disposed around and fixed to the center column 130 axially above the spiral vane diffuser 140 and is located generally within the oil region 116. The circular upper edge 174 of the spillover bucket 172 is configured as a spillover weir. Recovered oil in the oil region 116 that rises axially above the upper edge 174 can spill over into the oil spillover bucket 172. An oil transport conduit 176 connected to the bottom of the oil spillover bucket 162 can establish fluid communication between the oil spillover bucket and one or more downstream oil storage tanks. In contrast to oil, because the sand and solids are heavier than oil, water and other liquids, they can settle out of the inflowing mixture and are deposited as sediment in the sediment region 119 on the tank floor 108. To periodically remove sediment from the sediment region 119, one or more man holes 178 may be disposed into the tank sidewall 110. The separation tank 100 may be periodically taken out of service and the sediment removed therefrom. In other embodiments, the separation tank 100 may be operatively associated with an automatic sedimentation removal system disposed within the sediment region 119.

To further facilitate removal of oil from the inflowing mixture, the separation tank 100 can be operatively associated with an aeration system 180 configured to generate and introduce air or gas to a liquid that is directed back to the tank interior 104. The aerated liquid can mix and interact with the inflowing mixture in a manner that causes the oil entrained therein to separate and float to the oil region 116. The aerated liquid includes dissolved air or gases that create microbubbles that float through the inflowing mixture and that can adhere with the oil distributed in the inflowing mixture. The microbubbles function as germination or nucleation points where oil can coalesce and merge together. As the oil, and other suspended solids, and microbubbles gather and merge together, their buoyancy may increase enabling the oil, other suspended solids, and gas to axially float to the oil region 116 where the oil can be removed by the spillover bucket 172. The result may be to dramatically improve the quality of the water leaving the separation tank 100. In an embodiment, the aeration system 180 may be located externally of the separation tank 100, although in other embodiments some portion may be disposed in the tank interior 104.

In an embodiment, to obtain liquid to aerate, the aeration system 180 can receive recovered water from the separation tank 100 via a liquid inlet conduit 182 that is in fluid communication with the tank interior 104 through the tank sidewall 110. To ensure that oil and solids have been substantially removed from the recovered water received from the separation tank 110, the liquid inlet conduit 182 can be located generally coextensive with the lower portion of the liquid region 118 vertically just above the sediment region 119. A pump 184 can be fluidly connected to the liquid inlet conduit 182 that can draw and pressurize a portion of the recovered water from the tank interior 104. The pump 184 can be powered by an electric motor and can be configured as a dissolved air floatation pump for multiphase operation to mix and pump air or gas and the recovered water. In an embodiment, to obtain air or gas for aeration of the recovered water, the aeration system 180 can include a gas inlet conduit 186 that is in fluid communication with the gas region 114 at the vertical top of the separation tank 100 proximate the tank lid 106; however in other embodiments the aeration system 180 can draw air directly from the atmosphere. The gas inlet conduit 186 can join with the liquid inlet conduit 182 upstream of the inlet to the pump 184 and can introduce gas to the flow of recovered water utilizing, for example, a Venturi effect. The dissolved air or gas floatation pump 184 can include an internal centrifugal impeller designed to sheer and sufficiently pressurize the drawn recovered water in a manner that causes the air or gas to become dissolved therein. The gas can be entrained in and saturate the recovered water under pressure imparted from the pump 184, which may be approximately 50 to 90 pounds per square inch and that causes the gas to become part of the solution. Then, once the air or gas has been dissolved into the recovered water, and the pressure is released, the air or gas then may evolve from solution as microbubbles. Initially these bubbles may be extremely small. As they evolve they may grow in size so that the microbubbles may grow as large as 30 microns, or even larger. As the pressure increases, the gas may be actually dissolved in and stably merged with the recovered water and may not result in cavitation in the pump. A rotameter 188 can be included where the liquid inlet conduit 182 and gas inlet conduit 186 connect to measure and meter the quantity of gas introduced to the recover water.

In an embodiment, the aerated liquid can be directed from the pump 184 to a reservoir 190 prior to reintroducing the aerated liquid to the separation tank 100. The reservoir 190 can include a hollow shell configured to accommodate the pressurized aerated liquid so that the dissolved gas remains merged in the recovered water. The reservoir 190 may include a media that is configured to further intermix the recovered water and the gas. For example, the reservoir 190 can be packed with saddles 192 made of plastic or ceramic that provides a tortious flow path through the reservoir 190 and that may further serve to dissolve the gas into the recovered water. The reservoir 190 can be of any suitable size and may additionally serve to reduce pressure spikes or volumetric surges of the recovered water. To direct the aerated liquid back to the separation tank 100, the aeration system 180 can include a discharge conduit 194 that establishes fluid communication between the reservoir 190 and the tank interior 104. The discharge conduit 194 can be dimensioned so that aerated liquid remains under pressure from the pump 184 and the gases can remain entrained in the recovered water until the pressure may be reduced prior to entering tank 100. In a specific embodiment, the discharge conduit 194 can include a discharge port 196 that is disposed in and communicates with the upper section 132 so that the aerated liquid encounters the inflowing mixture in the vertical column 130. The discharge port 196 can connect to the upper section 132 vertically above where the inlet conduit 120 attaches and vertically below where the swirl vane diffuser 140 is mounted. Accordingly, as the inflowing mixture is introduced to the upper section 132 and moves axially upwards in the vertical column 130, it will intermix with the aerated liquid from the aeration system 180. Additionally, both the inflowing mixture and aerated liquid can be introduced to the tank interior 104 through the swirl vane diffuser 140 that can further intermix the two fluids.

Figure 3:
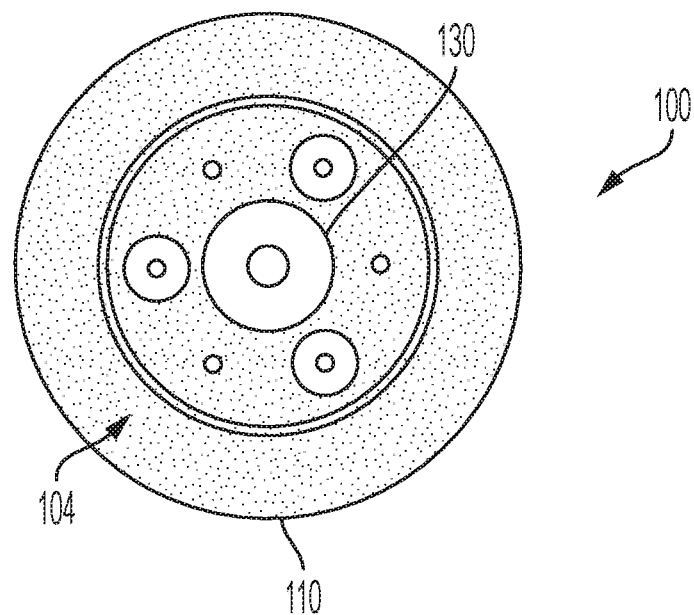
FIG. 3 is a top plan view into the tank interior of FIG. 1 illustrating a possible distribution pattern for the introduction of aerated liquid into the tank interior.

After the aerated liquid and the inflowing mixture are discharged into the tank interior 104 through the swirl vane diffuser 140, the expansive volume associated with the liquid region 118 allows the aerated liquid to disperse, spawning the emergence of microbubbles as the gas separates or evolves from the recovered water aerated solution. Microbubble formation due to depressurization in the liquid region 118 may be advantageously encouraged if the quantity of gas dissolved in the aerated liquid is at or beyond normal saturation. In addition, because the swirl vane diffuser 140 discharges radially outwards from the vertical column 130 in a 360° profile, the aerated liquid can be distributed through the tank interior 104. For example, referring to FIG. 3, the distribution of aerated liquid across a cross-section of the separation tank 100 is illustrated. In particular, because the aerated liquid is mixed with the inflowing mixture being introduced throughout the swirl vane diffuser 140, the microbubble formation may generally concentrate across the diameter of the tank interior 104. As the microbubbles emerge from the recovered water, they may merge together increasing in size and buoyancy and floating vertically upward to the oil region 116. The microbubbles also can adhere with the entrained oil by natural surface tension attraction, removing it from the water and directing the oil to the oil region 116 where it can be collected around the oil bucket 172. The gas bubbles may thereafter progress to and collect in the gas region 114. It is believed that introducing an aerated liquid to the upper section 132 of the vertical column 130 improves the recovery of oil from the inflowing mixture.

Figure 4:
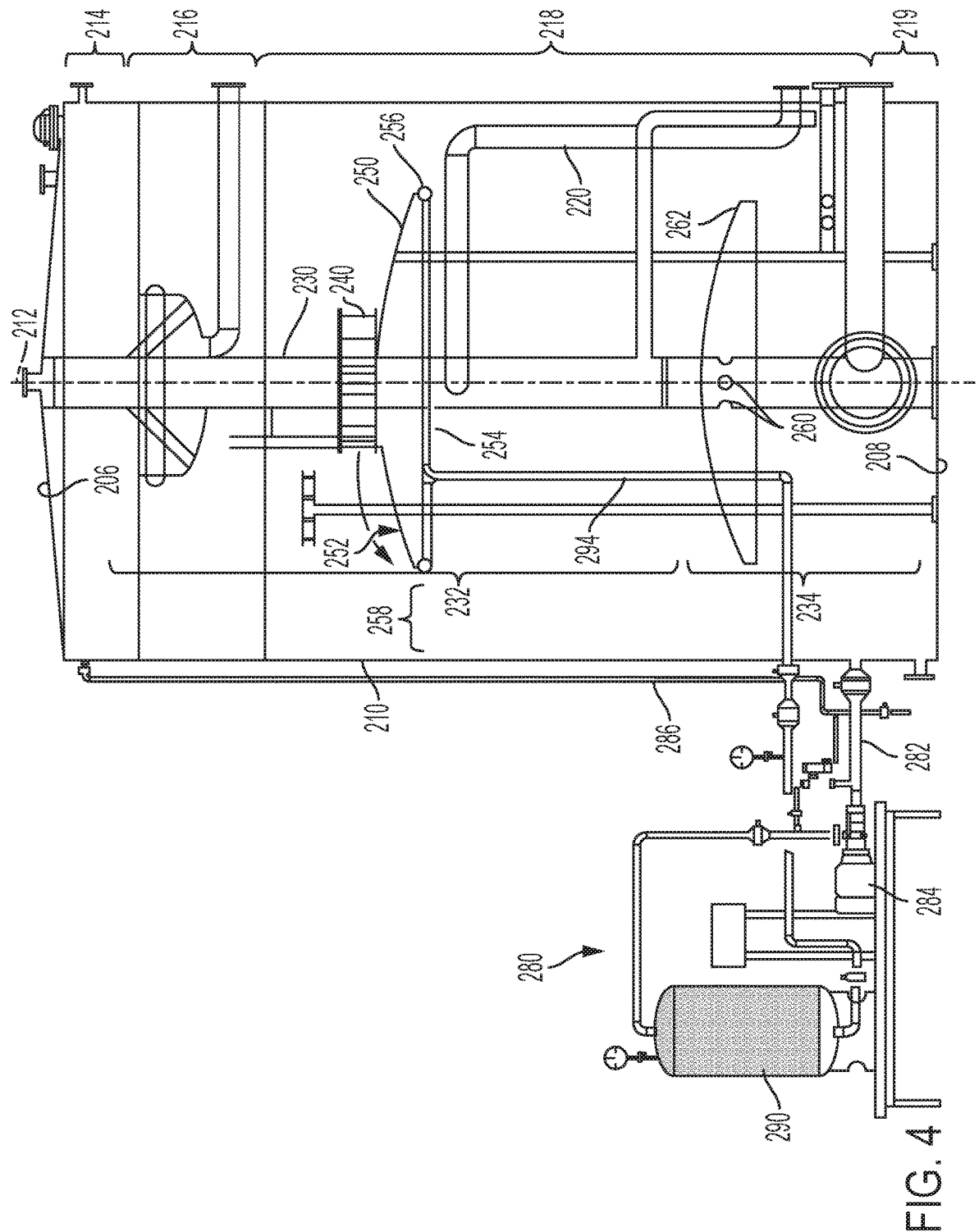
FIG. 4 is a side elevational view of another embodiment of a separation tank showing the internal components therein and an aeration system operatively associated with the separation tank according to another aspect of the disclosure.

Referring to FIG. 4, there is illustrated another embodiment of a separation tank 200 operatively configured to introduce an aerated liquid to the tank interior to facilitate removal and recovery of oil from the inflowing mixture. The separation tank 200 may be structurally similar to the separation tank 100 illustrated in FIG. 1 and can include a tank interior 204 enclosed in and defined by a tank lid 206, a tank floor 208, and a tank sidewall 210. The separation tank 200 can have a vertical height and can be arranged about a vertical axis 212 that extends between the tank lid 206 and tank floor 208. In operation, the separation tank 100 can also be vertically divided or separated into a gas region 214, an oil region 216, a liquid region 218, and a sediment region where the constituents of the inflowing mixture may separate and collect. To direct the inflowing mixture to the tank interior 204, the separation tank 200 can also include an inlet conduit 220 and a vertical column 230 that has been separated into upper and lower sections 232, 234 by a blanking plate 236. Mounted to the vertical column 130 can be a swirl vane diffuser 240 of the type described with respect to FIG. 2.

The separation tank 100 can also include an upper flow diverting baffle 250 similar in shape to the baffle described with respect to FIG. 1. The upper flow diverting baffle can include a convex upper surface 252 and a concaved lower surface 254 that are configured to direct the flow of inflowing mixture and to provide a surface against which oil may coalesce and solids may separate from the inflowing mixture. The upper flow diverting baffle 250 can again have a generally circular outline and can terminate at an upper baffle rim 256 that defines the circumference of the baffle. The upper baffle rim 256 and the interior of the tank sidewall 210 can be spaced apart from each other to define an upper annular passage 258 through which the inflowing mixture can flow from the upper portion of the liquid region 218 to the lower portion of the liquid region 218. To remove recovered water from the lower portion of the liquid region 218, the separation tank 200 can also include a lower flow diverting baffle 262 mounted to the lower section 234 of the vertical column 230 that can redirect flow of the recovered water to a plurality of orifices 260 disposed in the lower section.

To generate and introduced aerated liquid to the tank interior 204, an aeration system 280 similar to that described above can be operatively associated with and located externally of the separation tank. To obtain the fluid for aeration, the aeration system 280 can include a liquid inlet conduit 282 in fluid communication with the liquid region 218 of the tank interior 204 and to obtain gas, the aeration system can include a gas inlet conduit 286 in fluid communication with the gas region 216. A pump 284 configured to mix and pressure recovered water and gas such as, for example, a multiphase dissolved air floatation pump can be coupled to the liquid inlet conduit 282 and the gas inlet conduit 286 and can direct the mixture of recovered water and dissolved air to a reservoir 290.

Figure 5:
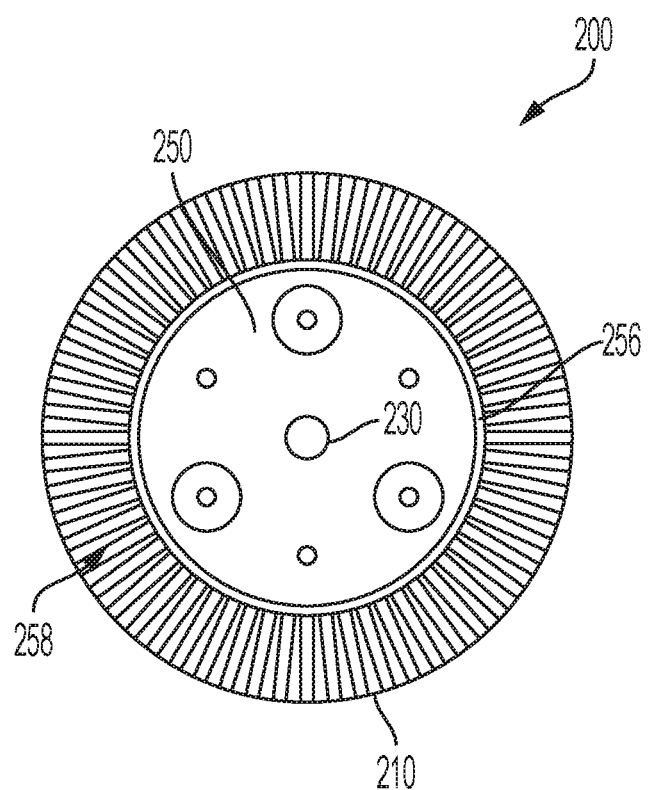
FIG. 5 is a top plan view into the tank interior of FIG. 4 illustrating a possible distribution pattern for the introduction of aerated fluid into the tank interior.

In contrast to the embodiment of FIG. 1 in which the aerated liquid is directed to the vertical column 130, the separation tank 200 of FIG. 4 can introduce the aerated liquid directly to the tank interior 204. In particular, a discharge conduit 294 can extend from the reservoir 290 through the tank sidewall 210 to the tank interior 204 where the discharge conduit can be attached or mounted to the upper flow diverting baffle 250. The discharge conduit 294 can be configured as a perforated pipe that may be attached along the upper baffle rim 256 so as to extend about the circumference of the upper flow diverting baffle 250. Again, the aerated liquid that may be depressurized in the discharge pipe 294 can enter the expansive tank interior 204 through the perforation and may further depressurize allowing the formation of microbubbles from the merging of smaller gas bubbles dissolved in the aerated liquid. Because of the location of the discharge conduit 294 along the upper baffle rim 256, the microbubbles may form at and pass through the upper annular passage 258 between the interior of the tank sidewall 210 and the circumference of the upper flow diverting baffle 250 where they encounter the inflowing mixture. The microbubbles separating from the aerated liquid can adhere to the oil entrained in the inflowing mixture and can float the oil to the oil region 216. Referring to FIG. 5, the distribution of the microbubbles formed from the aerated liquid discharged to the tank interior 204 by the discharge conduit 294 attached about the upper baffle plate 250 is illustrated. In the illustrated embodiment, the microbubbles may concentrate in the upper annular passage 258 between the tank shell 204 and the upper baffle rim 256 of the upper flow diverting baffle 250 to encounter the inflowing mixture directed thereto from the swirl vane diffuser 240.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention. Terms of orientation or direction, such as "vertical" refer to elements as depicted in the figures assuming that the device is installed in a generally upright orientation as shown in FIG. 1.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A separation tank comprising:
   a tank shell defining a tank interior, the tank shell including a tank lid, a tank floor, and a tank sidewall extending between the tank lid and tank floor;
   a vertical column vertically arranged in the tank interior and configured for accommodating and directing fluid flow, the vertical column fluidly separated by a blanking plate into an upper section in fluid communication with an inlet conduit for receiving inflowing mixture and a lower section for discharging recovered water; and
   an aeration system in fluid communication with the tank interior to receive recovered water therefrom and in fluid communication with the upper section of the vertical column with a discharge conduit connected above the inlet conduit to deliver aerated liquid thereto, the aeration system configured to aerate the recovered water with a gas.

2. The separation tank of claim 1, wherein the aeration system includes a multiphase pump to merge the gas with the recovered water.

3. The separation tank of claim 2, wherein the multiphase pump is a dissolved air floatation pump to dissolve the gas in the recovered water.

4. The separation tank of claim 3, wherein the tank interior is separated into a gas region, and oil region, a water region, and a sediment region.

5. The separation tank of claim 4, wherein the aeration system includes a gas inlet conduit in fluid communication with the gas region to draw the gas therefrom.

6. The separation tank of claim 5, further comprising a swirl vane diffuser mounted to the vertical column and establishing fluid communication between the upper section and the tank interior.

7. The separation tank of claim 6, wherein the aeration system includes a discharge conduit connected to and in fluid communication with the upper section below the swirl vane diffuser.

8. The separation tank of claim 7, wherein the discharge conduit connects to the upper section approximately within the top third of a vertical height of the vertical column.

9. The separation tank of claim 8, further comprising a flow diverting baffle mounted to the upper section of the vertical column below the swirl vane diffuser, the flow diverting baffle spaced apart from the tank sidewall and defining an annular passage there between.

10. The separation system of claim 9, wherein the aeration system includes a reservoir packed with media to enhance dissolving of the gas in the recovered water.

11. The separation system of claim 1, wherein the aeration system is located externally of the tank interior.

12. A method of separating constituents from an inflowing mixture comprising:
- directing an inflowing mixture including at least oil and water to a vertical column disposed within a separation tank via an inlet conduit;
- introducing an aerated liquid to the vertical column via a discharge conduit connected above the inlet conduit to interact with the inflowing mixture;
- directing the inflowing mixture radially outward of the vertical column to a tank interior of the separation tank, whereby gas bubbles from the aerated liquid adhere to oil in the inflowing mixture to separate oil from the inflowing mixture; and
- collecting oil separated from the inflowing mixture in an oil region within the tank interior.

13. The method of claim 12, further comprising collecting recovered water from the inflowing mixture in a liquid region located below the oil region.

14. The method of claim 13, further comprising aerating recovered water from the liquid region to produce the aerated liquid.

15. The method of claim 14, further comprising utilizing a gas collected in a gas region within the tank interior above the oil region to aerated the recovered water.

16. The method of claim 15, wherein the gas is dissolved in the recovered water by a dissolved air floating pump to produce the aerated liquid.

* * * * *